United States Patent Office 2,734,049
Patented Feb. 7, 1956

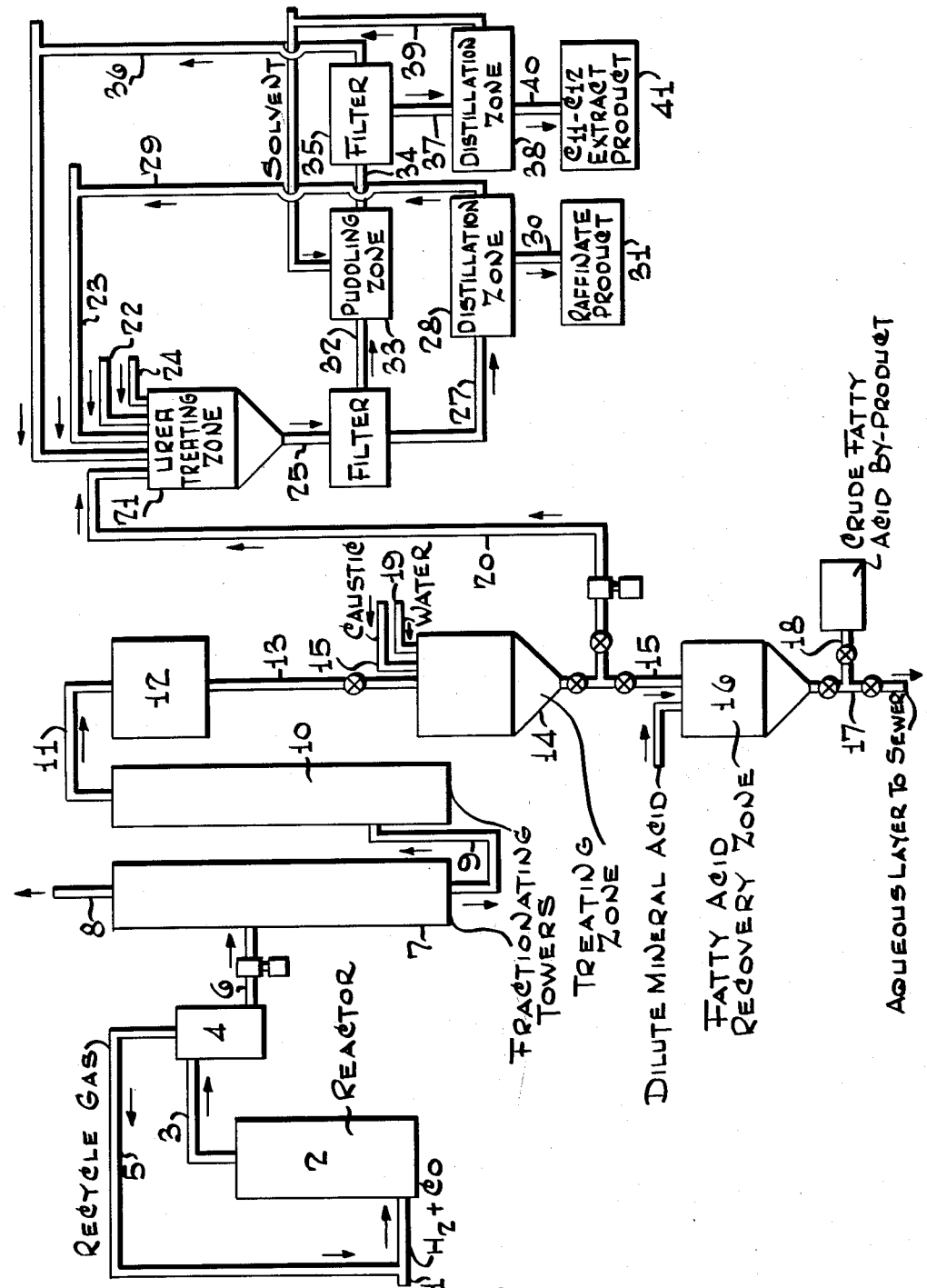

2,734,049

UREA EXTRACTION PROCESS FOLLOWING REMOVAL OF OXYGENATED ORGANIC COMPOUNDS

Egi V. Fasce, Baton Rouge, La., assignor to Esso Research and Engineering Company, a corporation of Delaware Application October 12, 1951, Serial No. 251,119

2 Claims. (Cl. 260—96.5)

This invention relates to a process for the extractive fractionation of hydrocarbons. More particularly it relates to improvements in the process of fractionally extracting hydrocarbons from mixtures thereof by the use of urea.

It is known that urea forms crystalline complexes with organic compounds of substantially aliphatic structure, while it appears to be inert in this respect toward branched compounds such as the isoparaffins, or cyclic compounds such as most aromatics and naphthenes. The complexes so formed are of indeterminate structure, but appear to be unstable molecular complexes rather than true chemical reaction products. This is indicated by their unstable character and the consequent ease of the regeneration of their components, namely urea and the unaltered organic compound.

This process has been applied successfully to the extraction of various petroleum fractions. However, experience has shown that when the process was applied to the extraction of hydrocarbons from the product obtained in the Fischer-Tropsch Synthesis, boiling above 300° F., unexpectedly low yields of extract are obtained.

This process has been applied successfully to the extraction of straight chain hydrocarbons, both paraffins and olefins, from various petroleum fractions. A particularly important source of such hydrocarbons are the hydrocarbon fractions obtained by the Fischer-Tropsch Synthesis in which carbon monoxide is reacted with hydrogen in the presence of a catalyst such as cobalt on kieselguhr or reduced iron. The fractions boiling above 300° F. obtained in this synthesis contain important amounts of olefins which are suitable for reacting with carbon monoxide in the Oxo process to form the corresponding next higher alcohol. However, when these hydrocarbon fractions, particularly those obtained with the iron catalyst, are subjected to the usual urea extraction, unexpectedly low yields are obtained. This is believed to be due to the fact that the products boiling above 300° F. and particularly those obtained by the use of an iron catalyst contain a relatively large amount of mixed oxygenated compounds including higher alcohols, aldehydes, and ester constituents, and it is believed that some of these constituents may interfere with the urea extraction.

Accordingly, it is the main object of this invention to provide an improved urea extraction process whereby the yields of extract from Fischer-Tropsch Synthesis products are increased.

In accordance with this and other objects set forth below, it has now been discovered that the extract yields obtained by the extraction of Fischer-Tropsch Synthesis products can be greatly increased by subjecting these products to a preliminary treatment with an alkali metal hydroxide such as sodium or potassium hydroxides. The strength of the metal hydroxide may suitably vary between 5 and 30% and 0.1–0.5 volumes of metal hydroxide per volume of Fischer-Tropsch product may be used. The preliminary treatment is believed in some manner to remove certain of the constituents which adversely affect the efficiency of the extraction step, as indicated above; however, it is not intended that this invention be limited by any theory to explain the effects observed.

The temperature in the alkali metal hydroxide treating zone is maintained preferably just below the boiling point of the alkali metal hydroxide solution. A suitable temperature for a 10% sodium hydroxide solution is between 210° F. and 220° F.

While the process of the present invention is effective in treating any of the Fischer-Tropsch product boiling 300° F. and above, it is particularly effective in treating the 370°–420° F. fraction which is especially suited for use in the Oxo process since it contains alpha olefins which undergo carbonylation on the 1 or 2 carbon atom. The invention, of course, is not limited to this fraction but may be used to treat the entire Fischer-Tropsch product boiling above 300° F. or any other fraction thereof, such a the heavy naphtha or Diesel oil cut boiling between 350° F. and 650° F.

The urea contacting step is carried out by admixing the feed with the desired amount of solid urea, or with a solution or a slurry of solid urea and a solvent for the urea and agitated for the desired period of time at a temperature most favorable for complex formation. After the urea complex has been completely formed, as evidenced by cessation of crystal formation, the mixture of crystal complex and oil is separated by simple filtration technique. The filtrate is then heated to drive off any remaining solvent. The urea complex can be decomposed by heating and/or diluting with water or by heating with an isoparaffin, such as isopentane, and the like. The complex-forming material, which is a liquid oil, may be extracted by any suitable means and the solid urea recovered for further use.

The ratio of urea to oil will vary with the type of feed and with the conditions of complex formation. In general, it is preferred practice to contact the oil with an amount of urea in excess of that necessary for complete complex formation. The solvent, if used, can be water, methanol, ethanol or other low molecular weight alcohols or an isoparaffin such as isopentane. The amount of solvent employed is not critical and good results are obtained when the urea is wet with the solvent or when a solution of urea is employed. Thus, 1–2% of the solvent is sufficient. It is often desirable to employ an alcohol in small amounts as an activator and use the isoparaffin as the actual solvent. In this case, the isoparaffin is used in a volume equal to the oil. After the urea has been mixed with the oil, a moderate degree of agitation is maintained throughout the contacting period. The length of this time will vary from ¼ to 1 hour, depending upon the base stock from which the fraction treated is taken and the amount of urea used in the treatment. During the treating period the temperature of the mixture is maintained within a range of from −25° to 100° F., and preferably 25° to 80° F.

In order to make the invention more clearly understood, there is shown in the accompanying drawings one means for carrying the same into practical effect.

Referring now to the drawing, a two-to-one mixture of hydrogen and carbon monoxide is fed at a rate of 77 vols. of gas per hour per wt. of catalyst by line 1 to reactor 2, where it is contacted with a reduced iron catalyst at a temperature of 654° F. under a pressure of 400 lbs./sq. in. The effluent from reactor 2 is passed by line 3 to separator 4 wherein unreacted hydrogen and carbon monoxide are removed and recycled to the reactor by line 5.

Liquid product is passed from separator 4 by line 6 to the midportion of distillation tower 7. Conditions are maintained in tower 7 so that all products boiling below 300° F. are taken overhead through line 8. The bottoms fraction is passed by line 9 to a second fractionating tower 10 where the product is separated into 50° fractions. When the Fischer-Tropsch product is to be used as feed for a subsequent Oxo process, it is very desirable to separate the Fischer-Tropsch product into narrow cuts since it is difficult to separate paraffin hydrocarbon by distillation from the primary alcohols formed in the Oxo process.

Each of the 50° cuts are passed by line 11 to an accumulator, such as accumulator 12, where, for example, the 370–420° F. is stored. Further description of this drawing will be in connection with this cut, although it is understood that any other 50° F. fraction boiling above 300° F. could be used as well. The cut is passed from accumulator 12 by line 13 to treating zone 14 when it is contacted for one hour with 10–50% of 10% sodium hydroxide introduced through line 15 at a temperature of 210–220° F. After completion of the treating with caustic in zone 14, the spent caustic is removed through line 15 and passed into recovery unit 16, where the caustic is contacted with a dilute mineral acid such as sulfuric, hydrochloric or nitric acid. After the reaction of the acid with the spent caustic, it is allowed to settle and the aqueous layer is passed to the sewer through line 17. The crude fatty acid byproduct set free by the action of the acid on the spent caustic is then withdrawn through line 18.

Returning now to treating zone 14, the oily product remaining after separation of the spent caustic is washed with water introduced through line 19. After completion of the water washing, the caustic-treated product is removed through line 20, and passed to urea tower 21, where it is contacted with an excess of urea introduced through line 22, and agitated while the temperature is maintained between −25° and +100° F. Solvent, such as water, methanol, ethanol, etc., is introduced through line 23 and methanol catalyst, if methanol is not used as the solvent, is introduced through line 24.

At the completion of the time necessary for the urea to form a complex with the straight-chain paraffins and olefins present, the mixture is withdrawn from treating zone 21 and passed by line 25 to filter 26, where the crystals of the urea complex are separated from the mother liquor which is withdrawn through line 27 and passed to distillation zone 28, where the solvent is recycled through line 29, while the raffinate is passed by line 30 to raffinate storage storage drum 31.

The urea-paraffin hydrocarbon complex is withdrawn from filter 26 by line 32 and passed to vessel 33, where it is repuddled with an isoparaffin solvent, such as isopentane, etc., whereupon the complex is decomposed, setting the straight-chain paraffins free from the solid urea. The mixture of solvent, oil and solid urea is passed by line 34 to a second filter 35, wherein the urea is separated from the solvent and hydrocarbon oil. The urea is removed from the filter and recycled by line 36 to the urea treating zone 21.

The filtrate from the second filtering step 35 is passed by line 37 to distillation zone 38, wherein the solvent is separated from the extract oil and recycled by line 39. The $C_{11}$-$C_{12}$ hydrocarbon extract is passed by line 40 to storage drum 41.

The advantages of the invention will be better understood from a consideration of the following experimental data which are given for the sake of illustration, but without intention of limiting the invention thereto.

*Example 1*

A mixture of hydrogen and carbon monoxide in the ratio of 2.13 hydrogen to 1 of carbon monoxide was passed over a reduced iron ammonia synthesis catalyst at a temperature of 654° F. and under a pressure of 402 pounds/sq. in. at a rate of 77.4 volumes of gas per hour per pound of catalyst. The product was fractionated into 50° F. fractions and the 370°–420° F. fraction, representing 5 volume percent of the total product, was extracted with urea both before and after pre-treatment with caustic. The urea extraction was carried out on a liter sample with 100 gms. urea/100 cc. of feed, 100% isopentane solvent and 2% methanol on feed as an activator for one hour at 0° F. The preliminary caustic treatment was carried out by refluxing the feed with 50% of 10% sodium hydroxide at 210–220° F. for one hour, separating the caustic layer, and water washing the caustic-treated fraction to remove final traces of alkali. The following results were obtained:

| | Feed | | Extract (Run A) | | Extract (Run B)—(Check) | |
|---|---|---|---|---|---|---|
| | Before NaOH Extn. | After NaOH Extn. | From Feed before NaOH Extn. | From Feed after NaOH Extn. | From Feed before NaOH Extn. | From Feed after NaOH Extn. |
| Yield, wt. percent on feed | 100.0 | 100.0 | 14.1 | 29.0 | 9.2 | 27.7 |
| Gravity, °API | 43.5 | 44.1 | 48.9 | 49.8 | 51.3 | 49.5 |
| Bromine No | 61 | 63 | 52 | 59 | 58 | 50 |
| Percent $C_{11}$ Olefins | 59 | 61 | 50 | 57 | 56 | 48 |
| OH No | 12 | 14 | 5 | 9 | 4 | 5 |
| CO No | 12 | 14 | 7 | 5 | 12 | 8 |
| Saponification No | 28 | 33 | 62 | 46 | 57 | 51 |
| Acid No | 0.38 | 0.2 | 0.4 | 0 | Trace | Trace |
| Percent $C_{10}$ Ester [1] | 8.6 | | | | 17.5 | |

[1] Determined from the total amount of acid and ester (calculated from the boiling point) by difference from the amount of acid as determined by titration with an alkali.

From the above data it is clear that the total extract yield can be more than doubled by treating the feed with caustic prior to urea extraction. In the first case, the yield was increased from 14.1% to 29% and in the second, from 9.2 to 27.7.

The nature of the present invention having been thus fully set forth and specific examples of the same given, what is claimed as new and useful and desired to be secured by Letters Patent is:

1. Process for concentrating straight-chain olefins in the hydrocarbon product boiling between 350° and 650° F. obtained by the Fischer-Tropsch Synthesis which comprises treating the hydrocarbon product at 210°–220° F. with 0.1–0.5 vol. of 5–30% alkali metal hydroxide/vol. of hydrocarbon product and then agitating the treated product with urea to form a complex of the urea with the straight-chain olefins, filtering the complex, and recovering the straight chain olefins from the complex.

2. Process for separating straight-chain olefins from the olefin-rich fraction boiling 370–420° F. obtained in the Fischer-Tropsch Synthesis which comprises refluxing the olefin-rich fraction with 50% of 10% sodium hydroxide at 210–220° F. for one hour, separating the sodium hydroxide layer, water washing the caustic-treated fraction to remove final traces of alkali and agitating the treated fraction with urea in the presence of 100% isopentane solvent, and 2% methanol activator at 0° F., to form a complex of the straight-chain olefins with the urea, filtering the complex and recovering the olefins from the complex.

References Cited in the file of this patent

UNITED STATES PATENTS

| 2,518,677 | Garner et al. | Aug. 15, 1950 |
| 2,520,715 | Fetterly | Aug. 29, 1950 |
| 2,560,360 | Mertzweiller et al. | July 10, 1951 |
| 2,581,102 | Hodges | Jan. 1, 1952 |
| 2,598,953 | Weitkamp et al. | June 3, 1952 |
| 2,606,214 | Higley et al. | Aug. 5, 1952 |

OTHER REFERENCES

Zimmerschied et al.: "The Petroleum Engineer," Reference Annual, 1950, pages C 43–47.